(12) United States Patent
Mesic et al.

(10) Patent No.: US 11,086,704 B2
(45) Date of Patent: Aug. 10, 2021

(54) INFERRED DETECTION OF DATA REPLICATION ERRORS OF SOURCE APPLICATIONS BY ENTERPRISE APPLICATIONS

(71) Applicant: Honeywell International Inc., Morris Plains, NJ (US)

(72) Inventors: Thomas M. Mesic, London (CA); Seth G. Carpenter, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 764 days.

(21) Appl. No.: 15/582,104

(22) Filed: Apr. 28, 2017

(65) Prior Publication Data

US 2018/0314575 A1 Nov. 1, 2018

(51) Int. Cl.
*G06F 11/00* (2006.01)
*G06F 11/07* (2006.01)

(52) U.S. Cl.
CPC .............................. *G06F 11/0757* (2013.01)

(58) Field of Classification Search
CPC ............... G06F 11/079; G06F 11/0709; G06F 11/0757; G06F 11/0769; G06F 11/0772
See application file for complete search history.

(56) References Cited

U.S. PATENT DOCUMENTS 8,352,450 B1 * 1/2013 Mraz .................... G06F 16/273
707/705
8,489,923 B1 * 7/2013 Lakshminarayanan ......................
H04N 21/2662
714/26
2010/0057737 A1 * 3/2010 Srinivasan ............... G06K 9/62
707/E17.039
2014/0258790 A1 * 9/2014 Sorenson ............. G06F 11/006
714/48
2015/0163198 A1 * 6/2015 Moore .................. H04L 63/029
726/14

(Continued)

OTHER PUBLICATIONS

Yang et al., Design of a Distributed Computer Security Lab, Oct. 2004, dl.acm.org/, 16 pages (Year: 2004).*

(Continued)

*Primary Examiner* — Katherine Lin
(74) *Attorney, Agent, or Firm* — Seager, Tufte & Wickhem, LLP (57) ABSTRACT

This disclosure provides an apparatus and method for inferred detection of data replication errors of source applications by enterprise applications, including but not limited to in industrial control systems and other systems. A method includes periodically generating and storing a heartbeat data value by a site risk manager (RM) system. The method includes sending site data with the current heartbeat data value by the site RM system to an enterprise application executing on an enterprise RM system. The enterprise RM system periodically compares a current time and the last received heartbeat data value to produce a calculated time difference. The enterprise RM system determines that site data replication is not functioning correctly when the calculated time difference is greater than a predefined threshold. When the replication is not functioning correctly, the enterprise RM system notifies a user that replicated site data may be inaccurate.

18 Claims, 3 Drawing Sheets

(56) References Cited

U.S. PATENT DOCUMENTS

2018/0006910 A1* 1/2018 Yin .......................... G06F 9/44

OTHER PUBLICATIONS

Kim, PCT Written Opinion of the International Searching Authority, dated Jul. 27, 2018, https://patentscope.wipo.int, 5 pages (Year: 2018).*
Boukhari, Enterprise risk management application implementation case study, 2013, PMI® Global Congress, 6 pages (Year: 2013).*
Gerhards, "The Syslog Protocol", Network Working Group, Adiscon GmbH, Mar. 2009, 38 pages.
Knapp, "Security Intelligence and Analytics in Industrial Systems", Honeywell Users Group Europe, Middle East and Africa, 2014, 29 pages.
Koelemij, "Effective Defense in Depth Strategies for Industrial Control Systems", Honeywell Users Group Europe, Middle East and Africa, 2014, 21 pages.
Koelemij, "Designing a Secure Industrial Control System", Honeywell Users Group EMEA, Industrial IT Solutions, 2013, 11 pages.
Koelemij, "Making Cyber Security S.M.A.R.T.", Honeywell Industrial Cyber Security EMEA, HUG Training Session, 2014, 63 pages.
Ricks, "System Center 2012 R2 Operations Manager Documentation", Microsoft System Center 2012 R2, Microsoft Corp., Nov. 2013, 1389 pages.
Spear, "Industrial Cyber Security 101", Honeywell Users Group Europe, Middle East and Africa, 2015, 25 pages.
"Certification Testing Specification", OPC Foundation, Release Candidate 1.02, May 2014, 20 pages.
"Guide for Conducting Risk Assessments—Information Security", NIST Special Publication 800-30, Revision 1, NIST, U.S. Dept of Commerce, Sep. 2012, 95 pages.
"Honeywell Industrial Cyber Security Overview and Managed Industrial Cyber Security Services", Honeywell Process Solutions, Jun. 2014, 19 pages.
"Information Technology—Security Techniques—Information Security Risk Management", Bio Standards Publication, BS ISO/IEC 27005, 2011, 80 pages.
"Risk Management and Critical infrastructure Protection: Assessing, Integrating, and Managing Threats, Vulnerabilities and Consequences", CRS Rpt. for Congress, RL32561, Feb 2005, 28 pages.
"Security for Industrial Automation and Control Systems Part 2-3: Patch Management in the IACS Environment", ISA-TR62443-Feb. 3, 2015, Jul. 2015, 18 pages.
"Design and Planning Guide for System Center 2012—Operations Manager", System Center 2012, Microsoft Corp., Apr. 2012, 13 pages.

* cited by examiner

INFERRED DETECTION OF DATA REPLICATION ERRORS OF SOURCE APPLICATIONS BY ENTERPRISE APPLICATIONS

TECHNICAL FIELD

This disclosure relates generally to network security. More specifically, this disclosure relates to an apparatus and method for assessing cybersecurity risks across multiple systems or locations.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility. To detect or report a threat, it is often useful to efficiently and effectively monitor data from multiple sites or locations at a single system.

SUMMARY

This disclosure provides an apparatus and method for inferred detection of data replication errors of source applications by enterprise applications, including but not limited to in industrial control systems and other systems. A method includes periodically generating and storing a heartbeat data value by a site risk manager (RM) system. The method includes sending site data with the current heartbeat data value by the site RM system to an enterprise application executing on an enterprise RM system. The enterprise RM system periodically compares a current time and the last received heartbeat data value to produce a calculated time difference. The enterprise RM system determines that site data replication is not functioning correctly when the calculated time difference is greater than a predefined threshold. When the replication is not functioning correctly, the enterprise RM system notifies a user that replicated site data may be inaccurate.

Disclosed embodiments include a system comprising a controller and a memory, configured to perform processes as described herein. Disclosed embodiments also include a non-transitory machine-readable medium encoded with executable instructions that, when executed, cause one or more processors of a system to perform processes as disclosed herein.

In various embodiments, the heartbeat data value is a current timestamp. In various embodiments, the site RM system to sends the current heartbeat data value to an enterprise application executing on an enterprise RM system without the site data when the site data has not been updated. In various embodiments, the user is notified by one or more of displaying a visible error indication or sending an electronic communication. In various embodiments, the site data and current heartbeat data value are sent from the site RM system to the enterprise application executing on the enterprise RM system via a secure firewall that allows data to be sent to the enterprise application but does not allow data to be received by the site RM system from the enterprise RM system. In various embodiments, the heartbeat data value is generated by a source application or a replicator executing on the site RM system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
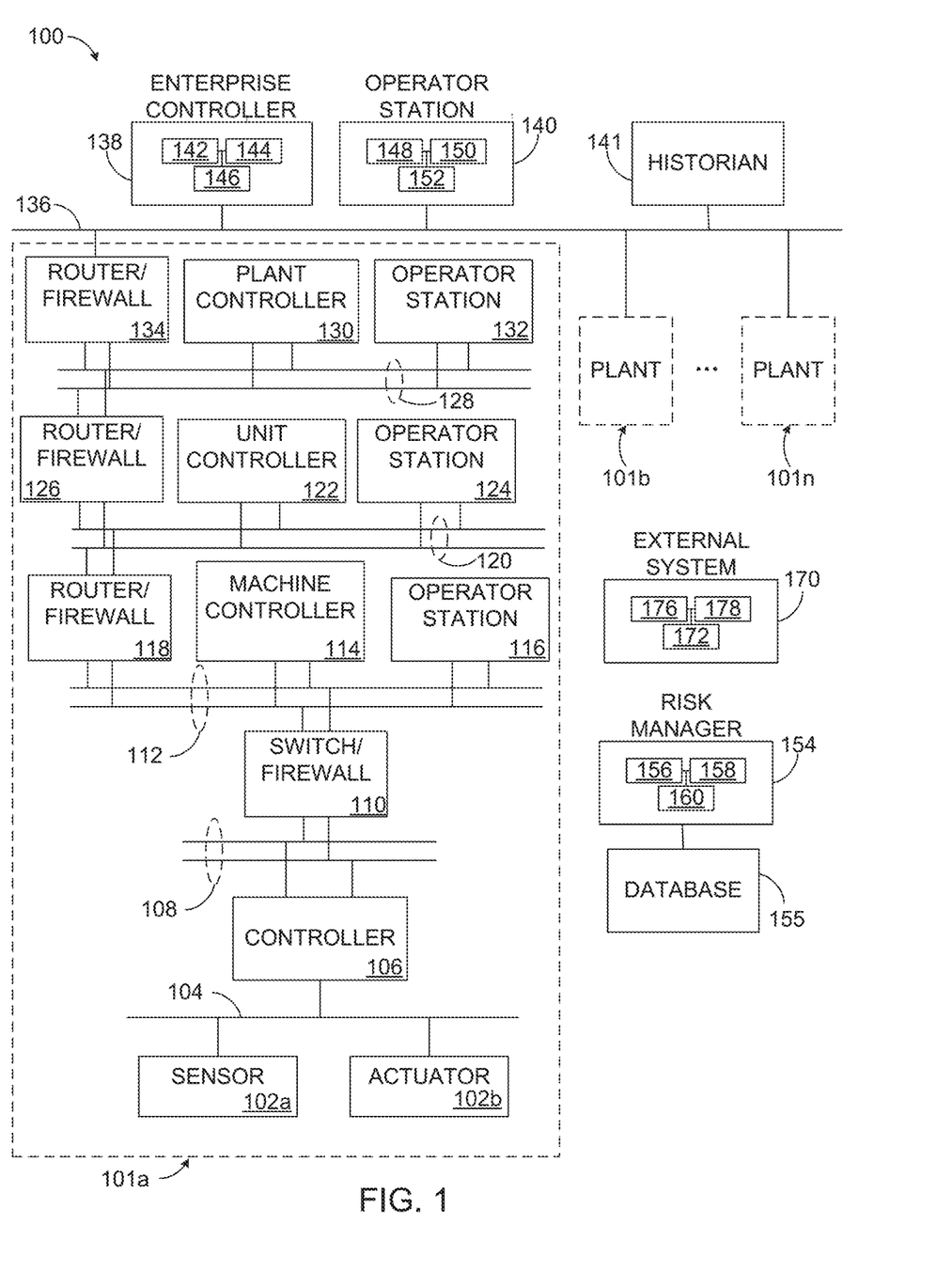
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n, Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102*a* to control the operation of one or more actuators 102*b*. For example, a controller 106 could receive measurement data from one or more sensors 102*a* and use the measurement data to generate control signals for one or more actuators 102*b*. Each controller 106 includes any suitable structure for interacting with one or more sensors 102*a* and controlling one or more actuators 102*b*. Each controller 106 could, for example, represent a proportional-integral-derivative (PID) controller or a multi variable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102*a*, and actuators 102*b*, which could be associated with a particular piece of industrial equipment (such as a boiler or other machine). For example, the machine-level controllers 114 could log information collected or generated by the controllers 106, such as measurement data from the sensors 102*a* or control signals for the actuators 102*b*. The machine-level controllers 114 could also execute applications that control the operation of the controllers 106, thereby controlling the operation of the actuators 102*b*. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102*a*, and actuators 102*b*).

One or more operator stations 116 are coupled to the networks 112. The operator stations 116 represent computing or communication devices providing user access to the machine-level controllers 114, which could then provide user access to the controllers 106 (and possibly the sensors 102*a* and actuators 102*b*). As particular examples, the operator stations 116 could allow users to review the operational history of the sensors 102*a* and actuators 102*b* using information collected by the controllers 106 and/or the machine-level controllers 114. The operator stations 116 could also allow the users to adjust the operation of the sensors 102*a*, actuators 102*b*, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected in or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, is represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Disclosed embodiments include systems and methods provide a holistic view of cyber-security data even across systems, sites, or network levels with different access controls. This is accomplished, in some embodiments, using a secure data replication and publication from one or more site risk manager systems to an enterprise risk manager system. Note that the "enterprise" risk manager system does not necessarily require that it be enterprise-level from a business standpoint, but rather indicates that the enterprise risk manager system can collect, analyze, and present data from multiple site risk manager systems.

Disclosed embodiments can be used in conjunction with commercial software and services, including but not limited to the HONEYWELL Industrial Enterprise Risk Manager (ERM) software application, for example executing on the enterprise risk manager system, and the commercially available HONEYWELL Industrial Cybersecurity Risk Manager (RM) software application, for example executing on the site risk manager systems.

The processes and results described herein can be accomplished (among other ways) using a risk manager 154. Among other things, the risk manager 154 supports a technique for replication of identity-derived primary keys without range restrictions.

In this example, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions. In some embodiments, the risk manager 154 includes, or is communication with, a database 155. The database 155 denotes any suitable structure facilitating storage and retrieval of information.

Disclosed embodiments enable the consolidation of risk manager data from a system such as the risk manager 154. The analysis and reporting can also or alternatively be accessed or performed, in some cases, by an external system 170. In this example, the external system 170 includes one or more processing devices 176; one or more memories 178 for storing instructions and data used, generated, or collected by the processing device(s) 176; and at least one network interface 172. Each processing device 176 could represent a microprocessor, microcontroller, digital signal process, field programmable gate array, application specific integrated circuit, or discrete logic. Each memory 178 could represent a volatile or non-volatile storage and retrieval device, such as a random access memory or Flash memory. Each network interface 172 could represent an Ethernet interface, wireless transceiver, or other device facilitating external communication. The functionality of the external system 170 could be implemented using any suitable hardware or a combination of hardware and software/firmware instructions. The external system 170 can be, for example, a stand-alone data processing system, a mobile device, an external server or enterprise system, or otherwise. The exemplary structure of the external system 170 described above is not intended to limit the structure or function of the devices that could be used to implement the external system 170. In various embodiments, one or more external systems 170 can act as the site risk manager systems when the enterprise risk manager system is implemented as risk manager 154. Conversely, one or more external systems 170 can act as the enterprise risk manager system when the site risk manager system(s) is implemented as risk manager 154.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition. FIG. 1 illustrates an example environment in which the functions of the risk manager 154 can be used. This functionality can be used in any other suitable device or system.

Companies that use industrial control systems (ICS) in their plant operations, usually adopt a network security architecture that divides the ICS network into zones, or levels, whereby each level adheres to strict policies specifying from which other levels it will accept data flows.

Often, company personnel, acting as decision makers, do not have direct access to certain network levels where key data resides—data which is required to carry out effective decision making by those select personnel. Therefore, critical data that is required by decision makers which is generated at levels possessing restricted access policies will commonly be shared (i.e. copied or replicated) to applications residing on levels with less restrictive policies so that it can be securely accessed.

Disclosed embodiments provide a mechanism for sharing data across network levels while adhering to the strict security architecture requirements commonly adopted by the industry.

Disclosed embodiments enable company personnel that only possess access to the enterprise risk manager system (such as at a corporate level) to view data generated by site risk manager systems executing within the more highly restricted manufacturing operations and control level. The enterprise risk manager (ERM) system can execute in the corporate level in various embodiments.

Disclosed embodiments can adhere to strict network security policies adopted by companies that use ICS systems while providing direct database-to-database replication of data from multiple site risk manager systems to the enterprise risk manager system.

If business and operational decisions are to be based on the data viewable at the enterprise application it is crucial that users of the enterprise application be able to determine whether the shared data represents the current (i.e., correct) state of the underlying source systems that actually generated the data. The user needs to understand whether the enterprise data should be trusted or whether the data should be treated as 'unreliable' on which to base business decisions.

In general, when determining if a source application has been fulfilling its function of transferring data to an enterprise application, it is common for the enterprise application to simply make a status query on the source application and request a response to that query. But in the industrial space, where network security restrictions do not necessarily allow for such simple request/response actions to take place in the required direction, disclosed embodiments employ an inference-based approach.

Disclosed embodiments include a detection mechanism coupled with visible notification to the enterprise application user, for the overall state of the replication process (e.g., whether it is working correctly or not). When the replication process is determined to not be functioning correctly, the enterprise application user should consider the data viewed at the enterprise displays as not accurate and therefore not suitable on which to base business or operational decisions. Problems in the data sharing mechanism/technology with which various embodiments can be used to infer about problems include, but are not limited to, MICROSOFT SQL SERVER transactional data replication.

Figure 2:
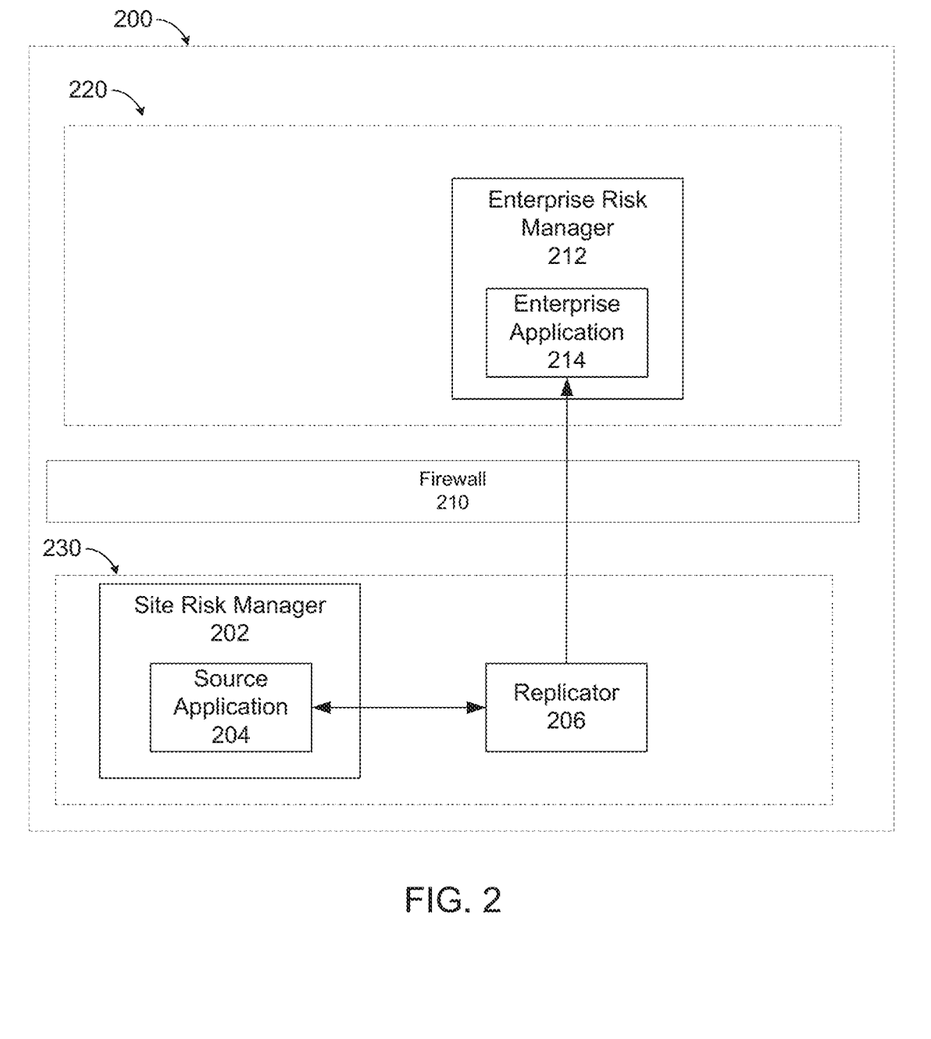
FIG. 2 illustrates a system for inferred detection of data replication errors of source applications by enterprise applications, in accordance with disclosed embodiments.

FIG. 2 illustrates a system 200 for inferred detection of data replication errors of source applications by enterprise applications, in accordance with disclosed embodiments.

In this example, system 200 shows a single example of a site risk manager 202 within a source application network level 230. System 200 can also include a replicator 206 within source application network level 230. Site risk manager 202 can be implemented as a risk manager 154, as any of the devices or components of FIG. 1, or as another data processing system. Site risk manager 202 executes a source application 204, which can have associated databases, tables, and other data.

System 200 also includes an enterprise risk manager 212 within an enterprise application network level 220. Enterprise risk manager 212 executes an enterprise application 214.

Source application 204 can act as a "publisher" application to send site data to enterprise application 214, which can act as a "subscriber" application. The data is sent through a secure firewall 210. As described above, for security purposes, this is typically a "one-way" data communication in that the source application 204 (and site risk manager 202) sends site data to the enterprise application 214, but cannot access or receive data from the enterprise application 214 or the enterprise risk manager 212, including any status queries. The site data sent from source application 204 to enterprise application 214 can, in some embodiments, be sent by a replicator system 206 which reads the appropriate site data from source application 204 and transmits it through the firewall 210 to enterprise application 214. Replicator system 206 is not needed in all embodiments in other cases, source application 204 transmits data directly to enterprise application 214.

The communications described herein can take place over any combination of public and private networks, including the Internet. Replicator system 206 can be implemented as a data processing system or other device, similar to risk manager 154, with one or more memories, controllers, and other components as will be recognized by those of skill in the art. Replicator system 206 can be implemented as a process executing on site risk manager 202.

The source application 204 executes an internal process that updates and stores an internal "heartbeat" data value periodically, such as every x minutes, on a continual basis. The heartbeat value is included in the data sharing/replication process executed by the source application 204, so that the heartbeat data value, such as a real-time clock value, is transmitted to the enterprise application 214 with any other data being transmitted. In other cases, the heartbeat function can be performed by replicator 206.

In some instances, such as when the underlying industrial processes that generate source application data are very well behaved, it is common that no new site data has been generated since the last data transfer, leaving only the updated heartbeat value included in the next data replication cycle. In these cases, the source application 204 or replicator 206 can nevertheless send the current heartbeat data value periodically.

The enterprise application 214 executes an internal "watchdog" process periodically, such as every x minutes, which calculates the difference between the current time and the last replicated heartbeat data value. If the calculated time difference is greater than a predefined threshold, enterprise application 214 determines that the replication is not functioning correctly. The enterprise application 214 notifies a user, such as displaying a visible error indication, sending an alert by text, email, or other electronic communication, or otherwise, indicating that the replicated site data residing in the enterprise risk manager may be out of date and hence inaccurate.

Figure 3:
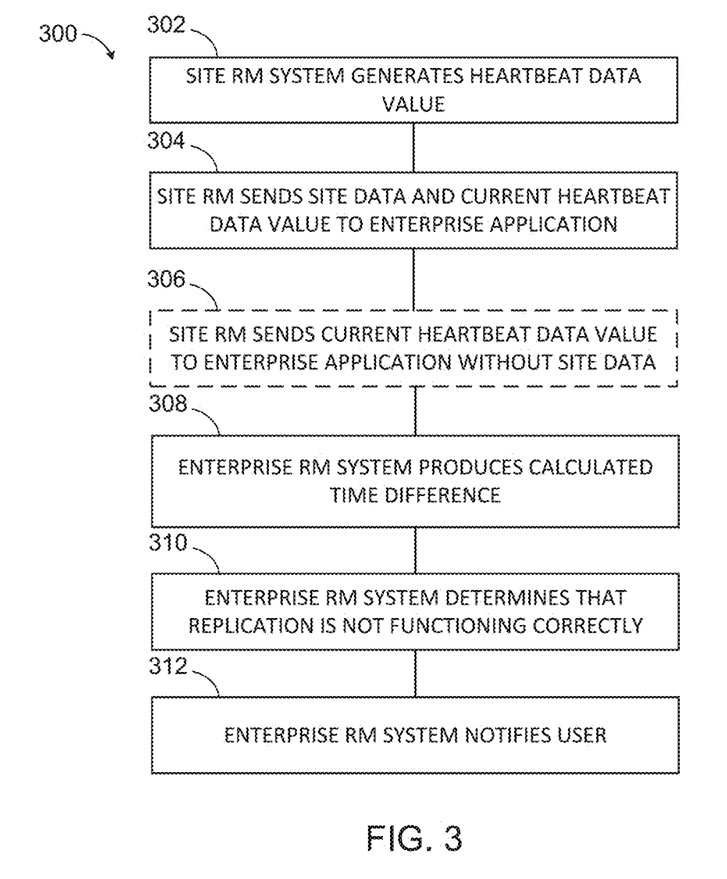
FIG. 3 illustrates a process in accordance with disclosed embodiments.

FIG. 3 illustrates a process 300 in accordance with disclosed embodiments, as can be performed by data processing systems of a system 200 as described herein.

A site RM system periodically generates and stores a heartbeat data value (302). The heartbeat data value can be a timestamp. The heartbeat data value can be generated by a source application or replicator executing on the site RM system.

The site RM system sends site data with the current heartbeat data value to an enterprise application executing on an enterprise RM system (304). This process can also be performed by a source application or replicator executing on the site RM system. The site data can be sent through a secure firewall that allows site data to be sent to the enterprise application but does not allow data to be received by the site RM system from the enterprise RM system.

If there is no updated site data to send to the enterprise application, the site RM system can periodically send the current heartbeat data value to an enterprise application executing on an enterprise RM system without any site data (306). This can be used by the enterprise application to determine that replication is occurring correctly, even if the site data is not updated.

The enterprise RM system periodically compares a current time and the last received heartbeat data value to produce a calculated time difference (308).

The enterprise application determines that site data replication is not functioning correctly when the calculated time difference is greater than a predefined threshold (310).

When the enterprise application has determined that the replication is not functioning correctly, the enterprise application notifies a user that the replicated site data may be inaccurate (312). The notification can be one or more of displaying a visible error indication, sending an alert by text, email, or other electronic communication, or otherwise.

Disclosed embodiments enforce key network security requirements, such as one-way direct data transfer from the site risk manager systems to the enterprise risk manager system. Disclosed embodiments can include one-way data transfer from the site risk manager systems to the enterprise risk manager system via an intermediate relay node residing in a "DMZ" level using data packet forwarding techniques.

Note that the risk manager 154, the replicator system, the RM systems, and/or the other processes, devices, and techniques described herein could use or operate in conjunction with any combination or all of various features described in the following previously-filed patent applications (all of which are hereby incorporated by reference):

U.S. patent application Ser. No. 14/482,888 entitled "DYNAMIC QUANTIFICATION OF CYBER-SECURITY RISKS IN A CONTROL SYSTEM";

U.S. Provisional Patent Application No. 62/036,920 entitled "ANALYZING CYBER-SECURITY RISKS IN AN INDUSTRIAL CONTROL ENVIRONMENT";

U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES" and corresponding non-provisional U.S. patent application Ser. No. 14/871,695;

U.S. Provisional Patent Application No. 62/113,221 entitled "NOTIFICATION SUBSYSTEM FOR GENERATING CONSOLIDATED, FILTERED, AND RELEVANT SECURITY RISK-BASED NOTIFICATIONS" and corresponding non-provisional U.S. patent application Ser. No. 14/871,521;

U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855;

U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA" and corresponding non-provisional U.S. patent application Ser. No. 14/871,732;

U.S. Provisional Patent Application No. 62/113,165 entitled "PATCH MONITORING AND ANALYSIS" and corresponding non-provisional U.S. patent application Ser. No. 14/871,921;

U.S. Provisional Patent Application No. 62/113,152 entitled "APPARATUS AND METHOD FOR AUTOMATIC HANDLING OF CYBER-SECURITY RISK EVENTS" and corresponding non-provisional U.S. patent application Ser. No. 14/871,503;

U.S. Provisional Patent Application No. 62/114,928 entitled "APPARATUS AND METHOD FOR DYNAMIC CUSTOMIZATION OF CYBER-SECURITY RISK ITEM RULES" and corresponding non-provisional U.S. patent application Ser. No. 14/871,605;

U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814; and U.S. Provisional Patent Application No. 62/114,937 entitled "APPARATUS AND METHOD FOR TYING CYBER-SECURITY RISK ANALYSIS TO COMMON RISK METHODOLOGIES AND RISK LEVELS" and corresponding non-provisional U.S. patent application Ser. No. 14/871,136; and U.S. Provisional Patent Application No. 62/116,245 entitled "RISK MANAGEMENT IN AN AIR-GAPPED ENVIRONMENT" and corresponding non-provisional U.S. patent application Ser. No. 14/871,547.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for inferred detection of data replication errors made by a source application executing on a site manager system of an industrial control system, the inferred detection done by an enterprise application executing on an enterprise manager system, the method comprising:
periodically generating an updated heartbeat data value by the site manager system, the site manager system including a replicator for replicating site data, the heartbeat data value comprising a current timestamp;
periodically replicating site data from the source application by the replicator; and
sending the replicated site data and the current heartbeat data value to the enterprise application via a secure firewall that includes network security restrictions that allow the replicated site data to be sent to the enterprise application but does not allow the enterprise application to query the site manager for data replication errors,
wherein the enterprise application:
periodically compares a current time and the last received heartbeat data value to produce a calculated time difference;
infers that site data replication is not functioning correctly when the calculated time difference is greater than a predefined threshold; and
when it is inferred that the site data replication is not functioning correctly, notifies a user that replicated site data may be inaccurate.

2. The method of claim 1, further comprising sending the current heartbeat data value to the enterprise application without the replicated site data when the replicated site data has not been updated.

3. The method of claim 1, wherein the user is notified by one or more of displaying a visible error indication or sending an electronic communication.

4. The method of claim 1, wherein the site manager system is a site risk manager system and the enterprise manager system is an enterprise risk manager system.

5. The method of claim 1, wherein the heartbeat data value is generated by the source application executing on the site manager system.

6. The method of claim 1, wherein the heartbeat data value is generated by the replicator executing on the site manager system.

7. A risk management system comprising:
a site risk manager system;
an enterprise risk manager system;
the site risk manager system configured to:
periodically generate an updated heartbeat data value;
periodically replicate site data from the site risk manager system; and
transmit the replicated site data and the updated heartbeat data value to an enterprise application executing on the enterprise risk manager system via a secure firewall that includes network security restrictions that allow the replicated site data to be sent to the enterprise application but does not allow the enterprise application to query the site risk manager for data replication errors, the enterprise risk manager system configured to:
- periodically compare a current time and the last received heartbeat data value to produce a calculated time difference;
- infer that site data replication is not functioning correctly when the calculated time difference is greater than a predefined threshold; and
- when it is inferred that the replication is not functioning correctly, notify a user that the replicated site data may be inaccurate.

8. The risk management system of claim 7, wherein the heartbeat data value is a current timestamp.

9. The risk management system of claim 7, wherein the site risk manager system is further configured to send the current heartbeat data value to the enterprise application executing on the enterprise risk manager system without the replicated site data when the replicated site data has not been updated.

10. The risk management system of claim 7, wherein the user is notified by one or more of displaying a visible error indication or sending an electronic communication.

11. The risk management system of claim 7, wherein the replicated site data and current heartbeat data value are sent from the site risk manager system to the enterprise application executing on the enterprise risk manager system.

12. The risk management system of claim 7, wherein the heartbeat data value is generated by a source application executing on the site risk manager system.

13. The risk management system of claim 7, wherein the heartbeat data value is generated by a replicator executing on the site risk manager system.

14. A non-transitory machine-readable medium encoded with executable instructions that, when executed, cause one or more processors of an enterprise risk manager system to:
- periodically receive an updated heartbeat data value from a site risk manager;
- periodically receive replicated site data from the site risk manager via a secure firewall that includes network security restrictions that allow the replicated site data to be received by the enterprise risk manager system but does not allow the enterprise risk manager system to query the site risk manager for data replication errors;
- periodically compare a current time and the last received heartbeat data value to produce a calculated time difference;
- infer that site data replication is not functioning correctly when the calculated time difference is greater than a predefined threshold; and
- when it is inferred that the site data replication is not functioning correctly, notify a user that replicated site data may be inaccurate.

15. The non-transitory machine-readable medium of claim 14, wherein the heartbeat data value is a current timestamp.

16. The non-transitory machine-readable medium of claim 14, wherein the executable instructions, when executed, further cause the one or more processors of the enterprise risk manager to receive the current heartbeat data value from the site risk manager system without receiving the replicated site data when the replicated site data has not been updated.

17. The non-transitory machine-readable medium of claim 14, wherein the user is notified by one or more of displaying a visible error indication or sending an electronic communication.

18. The non-transitory machine-readable medium of claim 14, wherein the heartbeat data value is generated by a source application or a replicator executing on the site risk manager system.

* * * * *